Sept. 26, 1950 — S. C. CADDY — 2,523,610
PRUNER AND LIKE CUTTING TOOL
Filed April 11, 1947 — 2 Sheets-Sheet 1
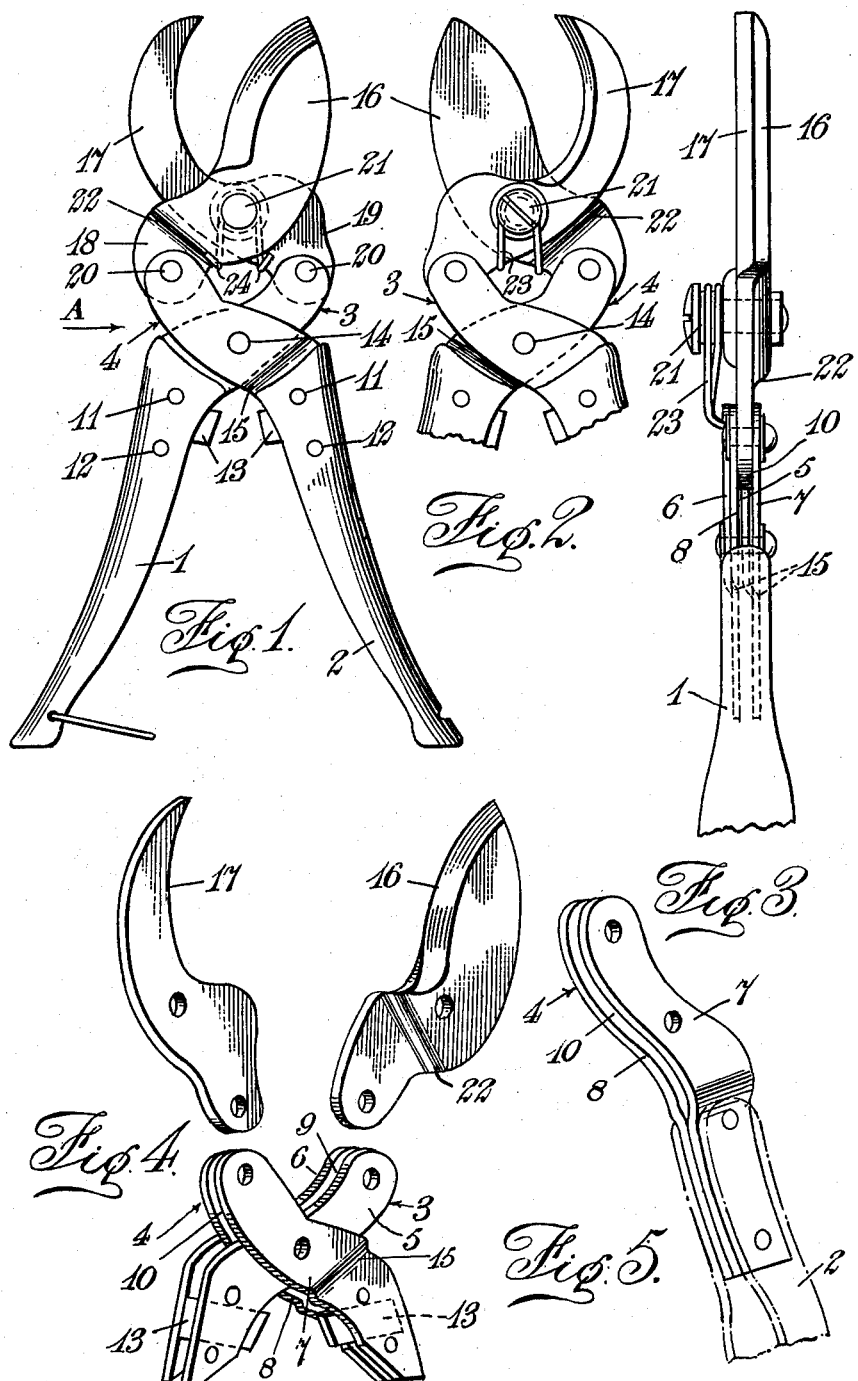
INVENTOR
Sydney Charles Caddy.
ATTORNEYS

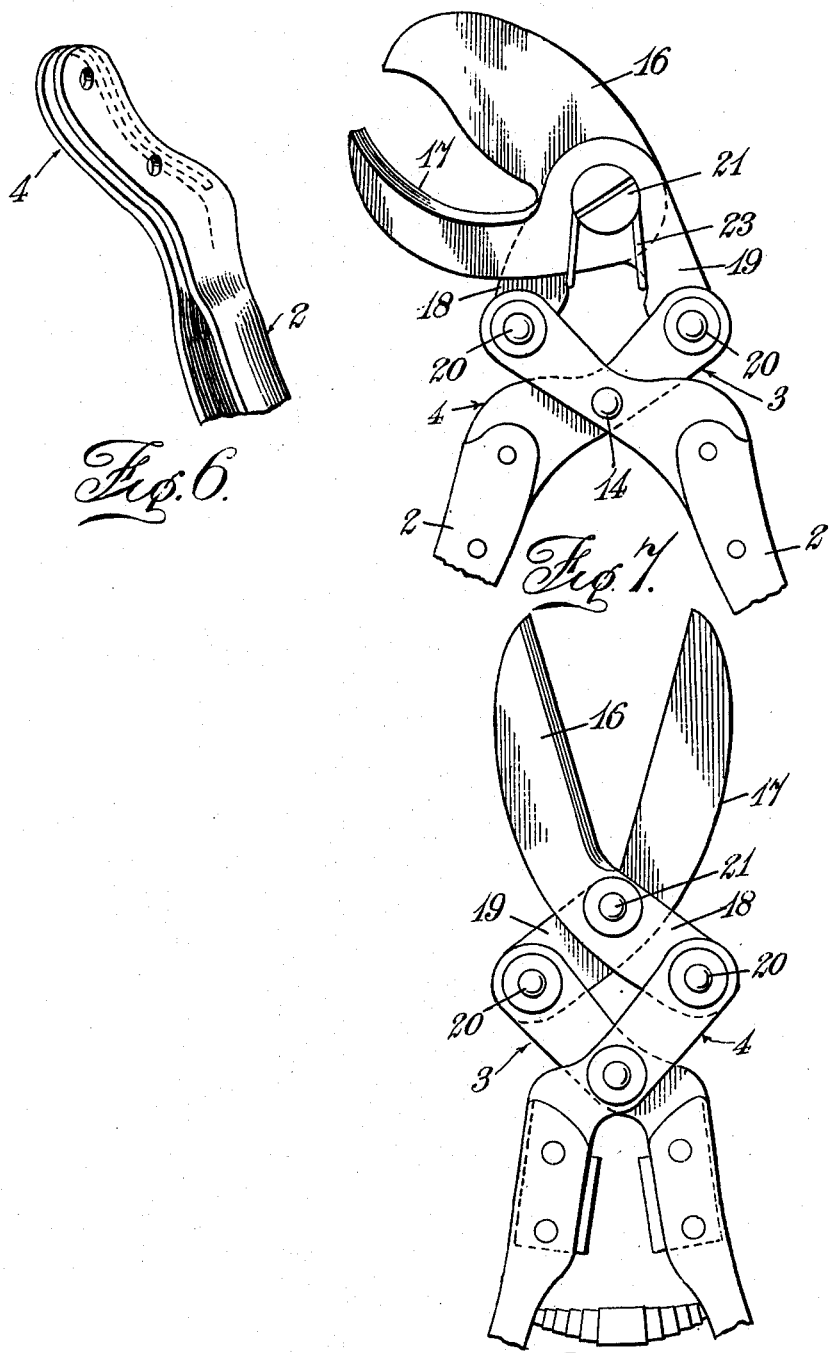

Patented Sept. 26, 1950

2,523,610

UNITED STATES PATENT OFFICE 2,523,610

PRUNER AND LIKE CUTTING TOOL

Sydney Charles Caddy, Haywards Heath, England, assignor to Leslie John Smyth, Thames Ditton, England Application April 11, 1947, Serial No. 740,859
In Great Britain February 18, 1946

Section 1, Public Law 690, August 8, 1946
Patent expires February 18, 1966

6 Claims. (Cl. 30—252)

This invention relates to pruning tools, wire cutters, hand operated shears and like tools.

The chief object of the present invention is to provide a pruning tool which is similar in size to existing tools of this kind, but wherein an improved lever arrangement is provided thereby increasing the cutting effort of the tool thus enabling twigs and stems to be cut that are normally beyond the capacity of the usual form of this tool.

Another object is to provide a tool, as previously described, wherein the major parts can be easily formed by press tools thereby cheapening manufacture, the construction also resulting in a tool which is lighter in weight than the ordinary pruner.

According to the present invention there is provided a pruning or like tool comprising a pair of pivotally connected and co-acting blades, each of the blades having an extension beyond the pivoted connection, and a pair of lever handles pivotally connected together each having an extension beyond the pivotal connection of the lever handles, the extension of one blade being pivotally connected to the extension on one of the lever handles and the extension of the other blade being pivotally connected to the extension of the other lever handle, the arrangement providing toggle-like lever connections between the blades and the lever handles.

In order that the present invention may be clearly understood and readily carried into effect, the same will now be described more fully, by way of example, with reference to the accompanying drawings in which:

Figure 1 is an elevation of one face of a pruning tool constructed in accordance with the present invention.

Figure 2 is an elevation of the upper part of the tool shown in Figure 1, but showing the reverse face.

Figure 3 is a side elevation, drawn to an enlarged scale, of the upper part of the tool, in the direction of the arrow A, Figure 1.

Figure 4 is a perspective view of the blades separated from each other and the handle extensions to which they are connected.

Figure 5 is a perspective view of a modified handle extension.

Figure 6 is a perspective view of a further modified form of handle extension.

Figure 7 is an elevation of the upper part of a tool according to the present invention, but showing a modified form of blades, and Figure 8 is an elevation corresponding to Figure 7, but showing blades of a different shape.

The application of the present invention to a pruning tool will now be described, from which example the adaptation of the invention to wire cutters, tinman's snips and tools of a similar description, will be readily understood.

Referring to Figures 1 to 5 inclusive of the drawings, a pair of lever handles 1, 2 which are U-shape in cross section are each provided with an extension of 3, 4 respectively. It is preferred that each of these extensions should comprise two coincident and spaced steel plates 5, 6 and 7, 8 respectively, shown more particularly in Figure 4, the spaced plates providing slots 9, 10.

The attachment of these bifurcated handle extensions to their respective lever handles may be conveniently effected by pinching together the lower ends of each pair of plates, Figure 5, and inserting the ends in the U-shaped channels of the handles, each handle also being pinched to tightly grip the extension therein. The positive attachment of the bifurcated extensions to their respective lever handles may be effected by rivets 11, 12 or by any other convenient means such as by screws or welding. In an alternative method of effecting the attachment of the extensions to their respective lever handles, a packing piece 13, Figures 1 and 4, may be inserted between the plates and secured therein by rivets or other suitable means. These packing pieces may be allowed to project, and thus form stops limiting the closing of the lever handles. In a further alternative construction, the extension of each lever handle may be formed integral with the handle, Figure 6, the end of each lever handle being suitably slotted in order to form the bifurcation. In order to effect the pivotal attachment of the lever handles, the plate 8 is inserted in the slot 9, and a rivet or the like 14, forming the pivotal connection, is passed through both pairs of plates. It will be obvious that single crossed plates could serve as these lever extensions, but these would have to be of an appreciable thickness in order to obtain the necessary strength, further, considerable off-setting of each plate at right angles to the plane of the tool would be necessary in order that the handles should lie in substantially one plane. By employing spaced plates each relatively of small thickness and interleafing them, adequate strength is assured, at the same time excessive off-setting, is unnecessary. In Figure 1 the slight off-setting is indicated at 15.

The blades 16, 17 of the tool may be off-set to one side of the tool, Figure 7, and the blades may be formed so as to resemble a parrot's beak. The blades 16, 17 are formed with extension 18, 19 respectively, the extension 18 being pivotally attached as at 20 in the bifurcation of the lever handle extension 4, the extension 19 being similarly pivotally attached in the bifurcation of the lever handle extension 3. The two blades are pivotally connected together in the normal manner by a bolt rivet or the like 21. It is preferred that one of the blade extensions, 18 for instance, should be off-set as at 22, in order that the blade extensions should lie substantially in one plane.

It will be apparent that the arrangement provides a system of compound levers, the extensions of the lever handles and those of the blades forming toggle levers. It will also be clear that a considerable cutting effort will be applied to an object inserted between the blades. As the most effective cutting action will be at that part of the blades nearest the fulcrum, the parrot's beak formation of blades serves to hold an object being cut adjacent the intersection of the blades during the whole of the cutting action. Further this particular form of blade also provides a shearing action, thus the greater leverage provided together with the shearing action enables twigs and stems to be cut obliquely.

Any convenient form of spring may be employed to retain the blades of the tool in open position. In the construction shown in Figures 2 and 7, a steel wire 23, is coiled around the bolt 21, the ends 24 of the wire being suitably shaped in order to engage the extensions 18, 19. It will be obvious that as an alternative arrangement to that described, the wire may be wound about the pivot 14, instead of the bolt 20, the ends acting against the extensions 3 and 4.

The present invention is also applicable to wire cutters and tinman's snips and Figure 8 shows suitable blades where the toggle lever arrangement, previously described, is applied to a wire cutter; and with a slight modification to the blades, this tool would serve as tinman's snips.

As it is desirable that the cutting edges of the blades should lie substantially in a central plane passing through both lever handles, the off-setting of the extension of the blades and also that of the lever handles will be generally arranged to achieve this result.

If desired, the lever handles may be covered with any suitable material such as will give comfort to the hand. Also, a clip or any other suitable means may be provided for holding the tool in the closed position when not required for use.

What I claim is:

1. A pruning or like tool of the type described comprising a pair of lever handles, an extension on each of said lever handles in the form of two superposed and spaced plate leaves, the handle extensions being crossed and interleafed by having one of the leaves of each of the handle extensions extending between the leaves of the other handle extension, means passing through the four leaves of the handle extensions for pivotally connecting the handles together, a pair of pivotally connected and co-acting cutting blades, an operating extension on each of said blades beyond the pivotal connection, each blade-operating extension being disposed between the two leaves of each handle extension, and means passing through each blade-operating extension and the two cooperating leaves of the handle extension for pivotally connecting the blades to the handles, the extensions of the blades and those of the handles forming toggle-like levers to increase the cutting effort of the blades.

2. A tool according to claim 1 wherein each of the lever handles is U-shaped in cross-section, each of the extensions of the handles comprising a pair of spaced plates pinched together at one end which end is inserted in the U-shaped channel of its respective handle and is rigidly secured thereto.

3. A tool according to claim 1 wherein each of the lever handles is U-shaped in cross-section, each of the extensions of the handles comprising two spaced plates, the corresponding ends of which are inserted in the U-shaped channel of its respective lever handle, a packing piece disposed between the inserted ends of the spaced plates, the adjacent parts of the lever handle being pinched onto the inserted ends of the plates and the packing piece therebetween and all of such parts being rigidly secured together.

4. A tool according to claim 3 wherein said packing pieces project from the handles inwardly towards each other to form abutments which limit closing of the tool.

5. A tool according to claim 1 wherein said blade extensions and the lever handle extensions are off-set in order that the lever handles will lie substantially in the same plane and the cutting edges of the blades will be positioned substantially in a plane passing through the longitudinal axes of both handles.

6. A tool according to claim 5 wherein the pivoted lever handle extensions are of bell crank form so as to greatly multiply the movement of the blades relative to the movement of the handles.

SYDNEY CHARLES CADDY.

REFERENCES CITED

The following references are of record in the file of this patent:

UNITED STATES PATENTS

| Number | Name | Date |
|---|---|---|
| 881,578 | Haskins | Mar. 10, 1908 |
| 1,101,181 | Hayden | June 23, 1914 |
| 1,572,546 | McKenney | Feb. 9, 1926 |

FOREIGN PATENTS

| Number | Country | Date |
|---|---|---|
| 210,156 | Switzerland | Sept. 2, 1940 |